United States Patent
Smith (10) Patent No.: US 11,629,640 B2
(45) Date of Patent: Apr. 18, 2023

(54) OIL PUMPING CONTROL FOR ELECTRICAL OIL PUMPING SYSTEM

(71) Applicant: Rolls-Royce North American Technologies Inc., Indianapolis, IN (US)

(72) Inventor: Alan W. Smith, Greenwood, IN (US)

(73) Assignee: Rolls-Royce North American Technologies Inc., Indianapolis, IN (US)

( * ) Notice: Subject to any disclaimer, the term of this patent is extended or adjusted under 35 U.S.C. 154(b) by 0 days.

(21) Appl. No.: 17/469,845

(22) Filed: Sep. 8, 2021

(65) Prior Publication Data

US 2023/0071735 A1  Mar. 9, 2023

(51) Int. Cl.
F02C 7/06 (2006.01)
F02C 3/04 (2006.01)
F02C 7/16 (2006.01)

(52) U.S. Cl.
CPC .............. *F02C 7/06* (2013.01); *F02C 3/04* (2013.01); *F02C 7/16* (2013.01); F05D 2220/76 (2013.01); F05D 2260/98 (2013.01); F05D 2270/303 (2013.01)

(58) Field of Classification Search
CPC .......... F02C 7/06; F02C 7/16; F05D 2220/76; F05D 2260/98; F05D 2270/303
See application file for complete search history.

(56) References Cited

U.S. PATENT DOCUMENTS

| | | | |
|---|---|---|---|
| 4,729,218 A | 3/1988 | Haselbauer et al. | |
| 5,118,258 A | 6/1992 | Martin | |
| 5,555,722 A | 9/1996 | Mehr et al. | |
| 6,914,344 B2 | 7/2005 | Franchet et al. | |
| 7,401,461 B2 | 7/2008 | Eick et al. | |
| 7,495,354 B2 | 2/2009 | Hermann | |
| 8,484,977 B2 | 7/2013 | Bader et al. | |
| 8,745,990 B2 | 6/2014 | Burkholder et al. | |
| 9,341,117 B2 | 5/2016 | Remer et al. | |
| 9,546,599 B2 | 1/2017 | Lindeman et al. | |
| 9,688,414 B2 | 6/2017 | Burns et al. | |
| 9,729,096 B2 | 8/2017 | Edwards | |
| 9,840,969 B2 | 12/2017 | Sheridan | |
| 10,125,692 B2 | 11/2018 | Ernst | |
| 2010/0028127 A1* | 2/2010 | Cornet | F16N 7/385 184/6.11 |
| 2014/0216403 A1* | 8/2014 | Stockner | F02M 69/08 123/445 |
| 2016/0319745 A1 | 1/2016 | Zeller | |
| 2016/0109133 A1* | 4/2016 | Edwards | F04D 13/06 60/746 |
| 2017/0284351 A1 | 10/2017 | Incerpi et al. | |

(Continued)

*Primary Examiner* — Steven M Sutherland
(74) *Attorney, Agent, or Firm* — Barnes & Thornburg LLP (57) ABSTRACT

An oil pumping system for use with a gas turbine engine includes an electric machine, an oil pump assembly, and a variable frequency drive controller. The variable frequency drive is connected with the electric machine and the oil pump assembly. The variable frequency drive controller is programmed to control a torque and speed of the pump motor independent of the gas turbine engine speed so that a flow of oil moved by the oil pump assembly is controlled to cool or lubricate components of the gas turbine engine independent of the gas turbine engine speed.

17 Claims, 3 Drawing Sheets

(56) References Cited

U.S. PATENT DOCUMENTS

| | | |
|---|---|---|
| 2019/0010874 A1 | 1/2019 | Perkinson et al. |
| 2019/0292937 A1 | 9/2019 | Mason |
| 2020/0216186 A1 | 7/2020 | Zywot et al. |
| 2020/0284164 A1 | 9/2020 | Gebhard et al. |
| 2020/0284195 A1 | 9/2020 | Gebhard et al. |
| 2020/0362728 A1 | 11/2020 | Davies |
| 2021/0062719 A1 | 3/2021 | Erickson et al. |

\* cited by examiner

OIL PUMPING CONTROL FOR ELECTRICAL OIL PUMPING SYSTEM

FIELD OF THE DISCLOSURE

The present disclosure relates generally to gas turbine engines, and more specifically to electrically driven oil pumping systems adapted for use in gas turbine engines.

BACKGROUND

Gas turbine engines are used to power aircraft, watercraft, power generators, and the like. Gas turbine engines typically include a compressor, a combustor, and a turbine. The compressor compresses air drawn into the engine and delivers high pressure air to the combustor. In the combustor, fuel is mixed with the high pressure air and is ignited. Products of the combustion reaction in the combustor are directed into the turbine where work is extracted to drive the compressor and, sometimes, an output shaft. Left-over products of the combustion are exhausted out of the turbine and may provide thrust in some applications.

Gas turbine engines may use lubricant in areas with rotating components to cool the components and reduce friction produced during the operation of the gas turbine engine. The lubricant may collect in one or more sumps and can be recirculated back to the areas of the gas turbine engine using oil pumps. Electrical oil pumping systems and controls for electrical oil pumping systems remain an area of interest in the field of gas turbine engines.

SUMMARY

The present disclosure may comprise one or more of the following features and combinations thereof.

A gas turbine engine oil pumping system includes a gas turbine engine that includes a compressor, combustor, and a turbine. The compressor and the turbine are configured to rotate about an axis at an engine speed. The system includes an electric machine, a rectifier connected to the electric machine, and an oil pump assembly configured to provide a flow of oil to the gas turbine engine. The oil pump assembly includes an oil pump and a pump motor mechanically coupled to the oil pump and configured to drive the oil pump. The system includes a variable frequency drive controller electrically connected between the rectifier and the pump motor. The controller is programmed to control a torque and speed of the pump motor independent of the engine speed so that the flow of the oil moved by the oil pump is controlled to cool or lubricate components of the gas turbine engine independent of the engine speed.

A method for use with a gas turbine engine includes rotating a compressor and a turbine of the gas turbine engine about an axis at an engine speed, generating electric power using an electric machine, supplying electric power to a pump motor connected to an oil pump, pumping oil from the oil pump to the gas turbine engine, and varying the electric power supplied to the pump motor to control a torque and speed of the pump motor independent of the engine speed.

These and other features of the present disclosure will become more apparent from the following description of the illustrative embodiments.

DETAILED DESCRIPTION OF THE DRAWINGS

For the purposes of promoting an understanding of the principles of the disclosure, reference will now be made to a number of illustrative embodiments illustrated in the drawings and specific language will be used to describe the same.

Figure 1:
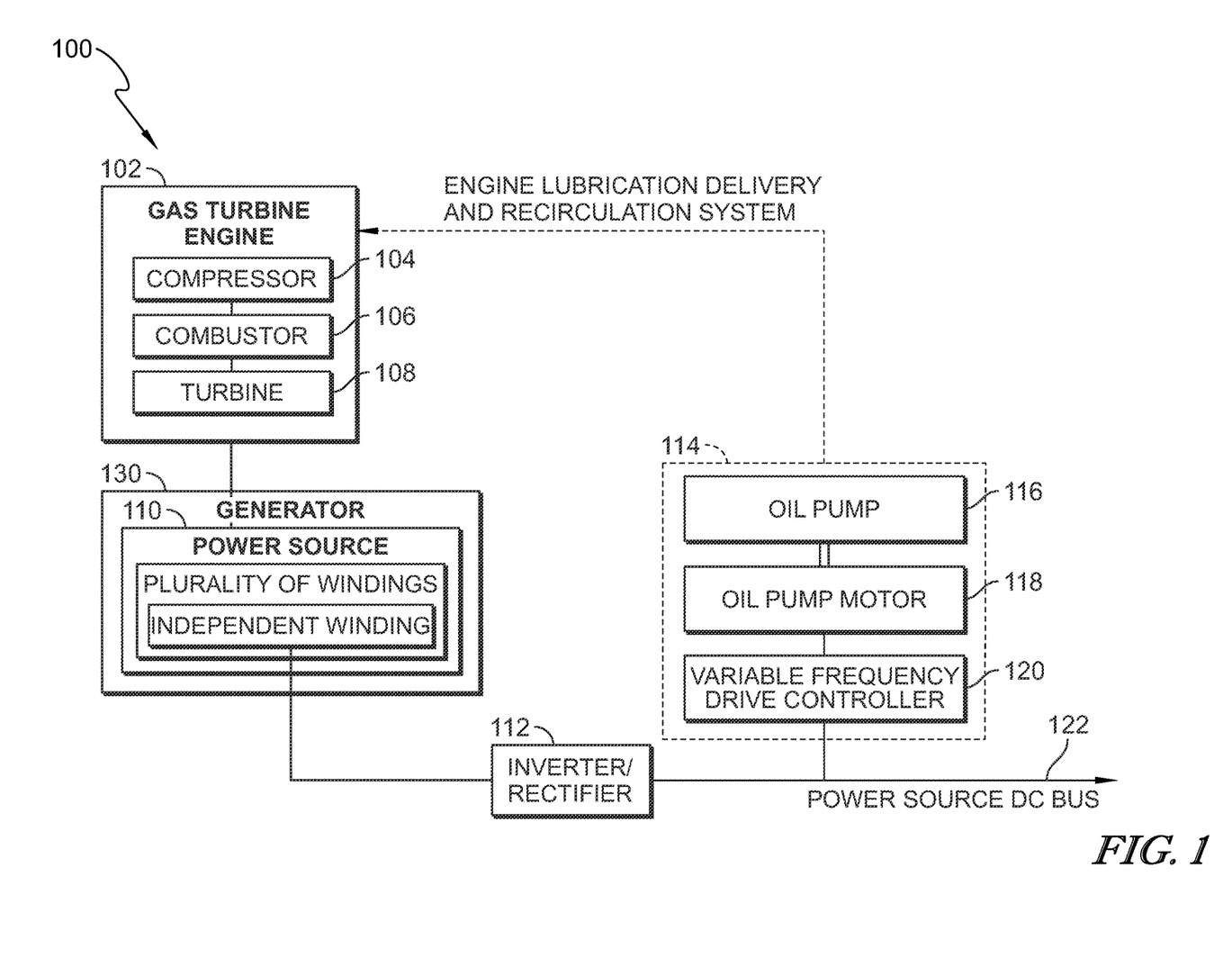
FIG. 1 is a block diagram illustrating a pumping system in accordance with the present disclosure and adapted for use in a gas turbine engine, the pumping system including a motor generator, a gas turbine engine, and an oil system powered by the motor generator and configured for provide lubrication to the gas turbine engine.

FIG. 1 illustrates an oil pumping system 100 for use with a gas turbine engine 102. The gas turbine engine 102 includes a compressor 104, combustor 106, and a turbine 108. The combustor 106 is mechanically and fluidly coupled between the compressor 104 and the turbine 108. The compressor 104 compresses intake air entering the gas turbine engine 102 and transfers the compressed air to the combustor 106, where the compressed air may be mixed with fuel and ignited generating energy that powers the turbine 108. The compressor 104 and the turbine 108 are configured to rotate about an axis of the gas turbine engine 102 at different engine speeds during use of the gas turbine engine 102.

Rotational motion of the turbine 108 may be transferred to a generator 130, e.g., via a shaft, and converted to electric power for immediate distribution to one or more electrical systems coupled thereto and/or to one or more energy storage devices, such as, but not limited to, one or more batteries. The generator 130 includes at least one power source 110 such as, for example, a dedicated set of electrical windings. The oil pumping system 100 includes an inverter-rectifier 112 and an oil pump assembly 114. The inverter-rectifier 112 is connected to the power source 110 of the generator 130. The oil pump assembly 114 is configured to provide a flow of oil to the gas turbine engine 102. The generator 130 may be a motor-generator configured to generate electric energy or receive electric energy to produce mechanical power.

The oil pump assembly 114 includes an oil pump 116, an oil pump motor 118, and a variable drive controller 120. The oil pump motor 118 is mechanically coupled to the oil pump 116 and configured to drive the oil pump 116. The variable drive controller 120 is electrically connected between the inverter-rectifier 112 and the oil pump motor 118. The variable drive controller 120 is configured to control the electric current and voltage provided to the oil pump motor 118 to control a torque and speed of the oil pump motor 118 independent of the engine speed so that the flow of the oil moved by the oil pump 116 is controlled to cool or lubricate components of the gas turbine engine 102 independent of the engine speed of the gas turbine engine 102. Controlling oil flow independent of gas turbine engine speed can have several benefits including, controlling the oil pressure at a cold start-up phase of the gas turbine engine 102 and operating the flow of oil at zero or low engine power and speed.

Alternating current (AC) power output by the power source 110 of the generator 130 is converted to direct current (DC) power, e.g., rectified, by the inverter-rectifier 112. Output of the inverter-rectifier 112 may be electrically connected to a power source DC bus 122. Additionally, the DC bus 122 can also be powered by an alternate source of DC power for example a battery on the aircraft. In an example, the power source 110 can be an electric machine.

Additionally or alternatively, the inverter-rectifier 112 may invert input DC power transferred, e.g., from a battery or another energy storage device, via the power source DC bus 122 to AC power for use by the generator 130 via the power source 110 when the generator 130 is operating as a motor and providing drive torque to the engine 102 for example during starting of the gas turbine engine 102.

In some instances, the power source 110 of the generator 130 is an electric machine that includes a plurality of windings. The oil pump motor 118 and variable frequency drive 120 can be powered from one of the plurality of windings of the electric machine. In still another example, the electric machine can be an electric starter generator configured for use in a motor mode to supply electrical energy to the gas turbine engine 102 to start the gas turbine engine 102 and in a generation mode in which the electric machine is configured to generate electrical power in response to being driven by the gas turbine The oil pump 116 can be a positive displacement pump configured such that fuel flow within the oil pumping system 100 is proportional to the speed of the oil pump 116. Examples of the oil pump 116 include, but are not limited to, a gear pump, a generated rotor pump (or gerotor pump), and a vane pump.

Figure 2:
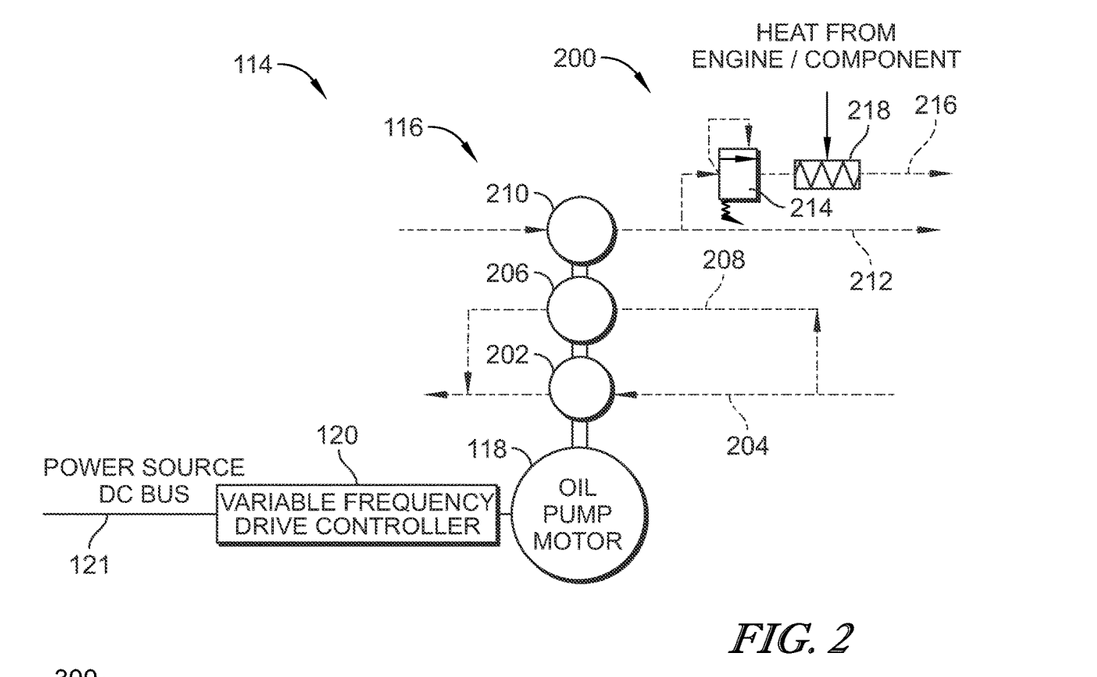
FIG. 2 is a block diagram illustrating the oil system included in the oil pumping system of FIG. 1, the oil system including an oil pump motor, an oil pump, and an oil pump shaft, wherein the oil pump motor is mechanically connected to operate the oil pump via the oil pump shaft and controlled by a variable drive controller.

FIG. 2 illustrates a pumping system 200 for use with a gas turbine engine. The pumping system 200 includes the oil pump assembly 114. The oil pump motor 118 is connected to and drives the oil pump 116. To meet a predefined oil flow demand that may correspond to a predefined speed of the oil pump 116, the variable drive controller 120 supplies a predefined amount of electric power, current and voltage, to the oil pump motor 118 to drive the oil pump 116 to achieve the required pump speed.

The oil pump 116 illustratively includes a plurality of pumping elements as suggested in FIG. 2. The pumping elements are configured to rotate together in the illustrative embodiment. The oil pump 116 includes a first pumping element 202 fluidly connected to a first oil scavenge line 204 and a second pumping element 206 fluidly connected to a second oil scavenge line 208. The oil pump 116 further includes a third pumping element 210 fluidly connected to a lubrication supply line 212 of the gas turbine engine 102. The pumping system 200 further includes a valve assembly 214 fluidly connected with a second oil supply line 216. Oil supply line 216 may be used for cooling of the engine or an engine component, for example a generator. Oil supply line 216 may be connected to a heat exchanger 218, the heat exchanger 218 may exchange heat with air or fuel or another cooling circuit including a two-phase cooling circuit. The valve assembly 214 may be a pressure regulated bypass valve or a back pressure regulating valve that opens as a result of the valve upstream pressure acting on a piston or diaphragm.

The variable drive controller 120 may be commanded or programmed to vary electric power supplied to the oil pump motor 118 based on a power demand of the oil pump 116 to maintain a predefined target pump speed independent of the engine speed so that the flow of the oil moved by the oil pump 116 is controlled to cool or lubricate components of the gas turbine engine independent of the engine speed.

In some instances, the oil pump motor 118 is configured to operate in a speed control mode. In other instances, the oil pump motor 118 is configured to operate in a torque control mode. Put another way, the variable drive controller 120 is programmed to operate the oil pump motor 118 in one of the speed control mode and the torque control mode.

In the speed control mode, the variable drive controller 120 controls frequency input to the oil pump motor 118 to achieve the required speed of the oil pump motor 118. In the torque control mode, the variable drive controller 120 controls an amount of current input to the oil pump motor 118 to achieve the required torque of the oil pump motor 118.

Figure 3:
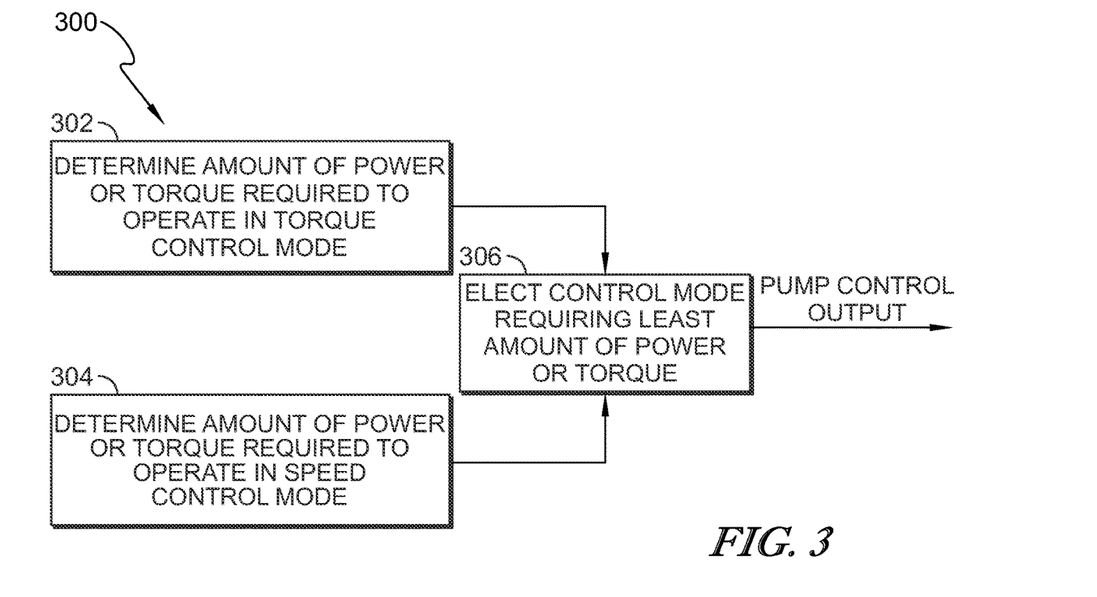
FIG. 3 is block diagram illustrating a process including selecting a control mode for operating the oil pump motor based on corresponding amounts of power or torque used to operate in one of a speed control mode or a torque control mode.

As illustrated in an example implementation 300 of FIG. 3, the variable drive controller 120 is programmed to operate in one of a speed control mode and a torque control mode based on corresponding amounts of power or torque used to operate in each of the two control modes. As just one example, the variable drive controller 120 determines at block 302 a first amount of power or torque used to operate the oil pump motor 118 in the torque control mode. The variable drive controller 120 determines at block 304 a second amount of energy used to operate the oil pump motor 118 in the speed control mode. At block 306 the variable drive controller 120 compares the first amount of power or torque and the second amount of power or torque and elects to operate in a control mode using the least amount of power or torque. In other words, the variable drive controller 120 elects to operate in the torque control mode in response to the first amount of power or torque being less than the second amount of energy and/or the variable drive controller 120 elects to operate in the speed control mode in response to the second amount of power or torque being less than the first amount of power or torque. In another example, the variable drive controller 120 is programmed to operate in one of the speed control mode and the torque control mode based upon current and voltage limits. The variable drive controller 120 operates the oil pump motor 118 in a first of the speed and torque control mode so long as the current and voltage to do so is less than predetermined values associated with the speed or torque control mode.

Additionally, when the first amount of power and the second amount of power are approximately equal and/or are within a threshold value of one another, the variable drive controller 120 may use one or more other criteria, operating conditions, and a prioritization or ranking schema for selecting the operating control mode.

During a start-up phase of the gas turbine engine 102, the variable frequency controller 120 is programmed to limit the torque of the oil pump motor 118 to a first predetermine torque and to limit the speed of the oil pump motor 118 to a first predetermined speed to minimize electric current and power of the pump motor and avoid over-pressure of the oil during the start-up phase. In an example start-up phase, the oil pump motor 118 is driven to the first predetermined torque. The oil is relatively cool during the start-up phase such that the oil pump motor 118 has a relative high torque (which causes the first torque limit to be controlling) and a relative low speed (below the first predetermined speed limit).

As the oil warms, the torque of the oil pump motor 118 automatically lowers and the speed of the oil pump motor 118 increases. The speed of the oil pump motor 118 can increase until the first predetermined speed stops the oil pump motor 118 from going any faster. At this warm oil, higher speed condition, the torque of the oil pump motor 118 may be at its lowest level and below the first predetermined torque limit. Thus, the first predetermined torque and speed limits automatically control the oil pump motor 118 during the cold oil start-up phase of the gas turbine engine 102. Moreover, the speed and torque of the oil pump motor 118 is regulated independent of the engine speed which would otherwise drive a conventional mechanically driven oil pump motor to non-ideal limits.

In some embodiments, the variable frequency drive controller 120 is programmed to detect the start-up phase of the gas turbine engine 102 based on a temperature of the oil being less than a predetermined temperature.

Figure 4:
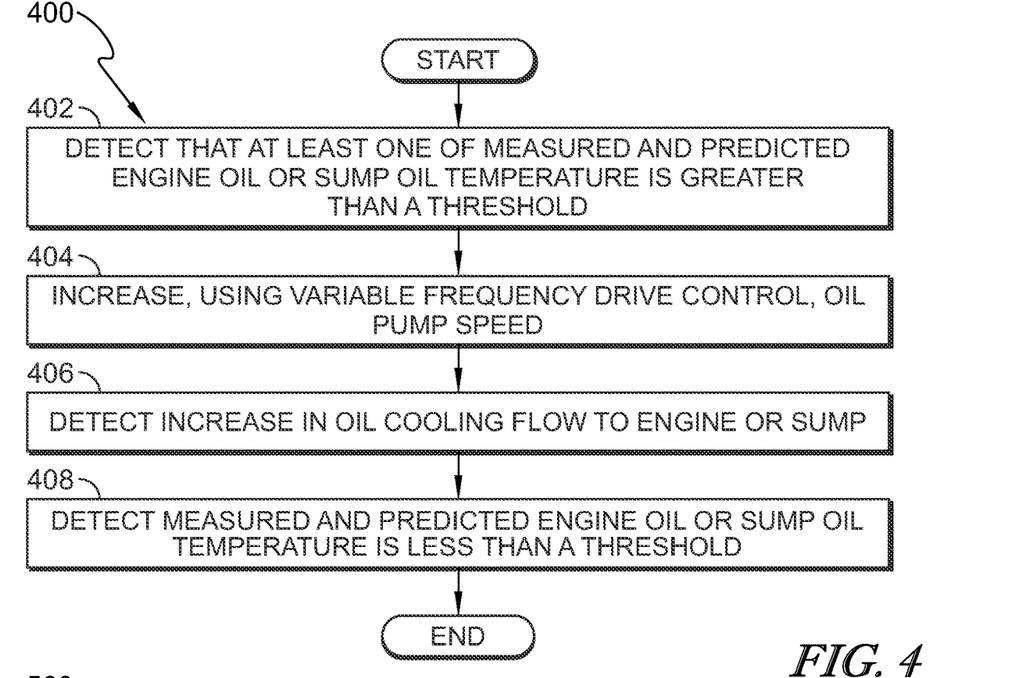
FIG. 4 is a block diagram illustrating a process including controlling a torque and speed of the pump motor independent of the engine speed so that the flow of the oil moved by the oil pump is controlled to cool or lubricate components of the gas turbine engine based on oil or sump temperature and independent of the engine speed.

FIG. 4 illustrates an example process 400 for providing additional cooling to oil circulating to the gas turbine engine 102 or sump to start or operate the gas turbine engine 102. One or more operations of the process 400 may be performed by the variable drive controller 120, alone or in combination with one or more sensors.

The process 400 begins at block 402 where the variable drive controller 120, during an engine start-up phase, detects that at least one of actual or predicted temperature of engine oil or sump is greater than a threshold temperature. In one example, the actual temperature of the engine or sump may be provided to the variable drive controller 120 by one or more engine or sump sensors. As another example, the predicted temperature of the engine 102 or sump may be provided to the variable drive controller 120 using the ambient temperature measurement. Additionally or alternatively, the variable drive controller 120 is configured to evaluate one or more operating conditions or parameters of the gas turbine engine 102.

In response to detecting that at least one of the actual or predicted temperature of engine oil or sump is greater than a threshold, the variable drive controller 120, at block 404, controls speed or current of the oil pump motor 118 to increase speed of the oil pump 116. At block 406, the variable drive controller 120 determines whether a flow of cooling air and/or fluid to cool the oil circulated to the engine 102 or the sump has increased. The variable drive controller 120 determines, at block 408, whether the actual and/or predicted temperature of the oil has decreased with the additional provided cooling. The variable drive controller 120 exits the process 400 in response to determining that the actual and/or predicted temperature of the oil is below a predefined temperature.

Figure 5:
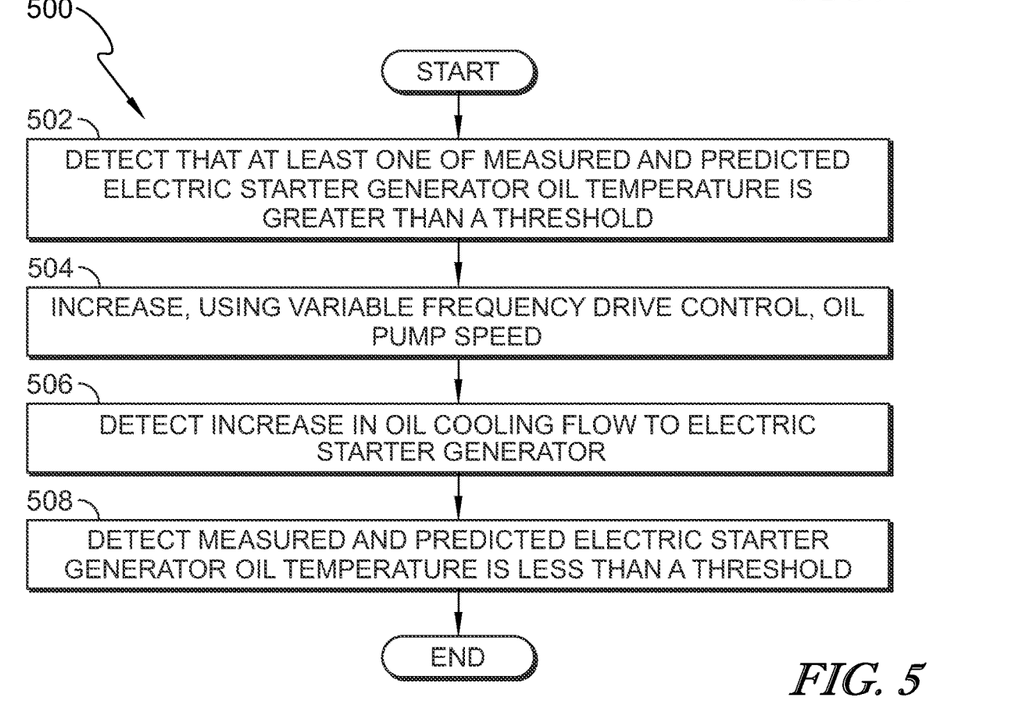
FIG. 5 is a block diagram illustrating a process including controlling a torque and speed of the pump motor independent of the engine speed so that the flow of the oil moved by the oil pump is controlled to cool or lubricate components of the gas turbine engine based on component temperature and independent of the engine speed.

FIG. 5 illustrates an example process 500 for providing additional cooling to oil circulating to one or more components of the gas turbine engine 102. One or more operations of the process 500 may be performed by the variable drive controller 120, alone or in combination with one or more sensors.

The process 500 begins at block 502 where the variable drive controller 120 detects that at least one of actual or predicted temperature of the one or more components of the gas turbine engine 102 is greater than a threshold. In one example, the actual temperature of the one or more components may be provided to the variable drive controller 120 by one or more engine sensors. In other instances, the variable drive controller 120 determines the actual temperature of the one or more components based on a temperature of the oil being circulated to and/or returning from the one or more components. As another example, the predicted temperature of the engine 102 may be provided to the variable drive controller 120 by an ambient temperature sensor. Additionally or alternatively, the variable drive controller 120 is configured to evaluate one or more operating conditions or parameters of the gas turbine engine 102 to determine the predicted temperature of the one or more components of the gas turbine engine 102.

In response to detecting that at least one of the actual or predicted temperature of the one or more components of the gas turbine engine is greater than a threshold, the variable drive controller 120, at block 504, controls speed or supplied current of the oil pump motor 118 to increase speed of the oil pump 116. At block 506, the variable drive controller 120 determines whether a flow of cooling air and/or fluid to cool the oil circulated to the one or more components of the engine 102 has increased. The variable drive controller 120 determines, at block 508, whether the actual and/or predicted temperature of the oil has decreased with the additional provided cooling. The variable drive controller 120 exits the process 500 in response to determining that the actual and/or predicted temperature of the oil is below a predefined temperature.

Traditional oil pump designs may use mechanical drives connected with the gas turbine engine or gearbox of the gas turbine engine such that pump speed and, hence, pump flow is proportional to engine speed and pump torque is controlled using an oil pressure limiter or pressure regulator. In particular, aerospace pumps tend to be mechanically driven due to reliability concerns with electronics. Among other reasons for not using electrically driven pumps and variable drives in existing propulsion engine applications is that larger engines typically include gearboxes which can be used to drive pumps. Installing a generator inside an engine may be challenging and accessing a generator that is installed inside an engine is also challenging.

The oil pumping system of the present disclosure uses the variable drive control to control the amount of cooling oil by increasing speed without a need for additional actively controlled valves and independent of engine speed. In some instances, a maximum cooling capacity may not be used when a speed of the engine approaches a maximum engine speed. For example, operating an engine at high altitude may use less cooling, e.g., less than a maximum cooling capacity, when the engine speeds are high, given lower ambient air temperatures.

Speed of the oil pump of the present disclosure is increased to increase oil flow. In an example, the system of the present disclosure is such that the pressure regulator opens to maintain constant pressure diver oil to be used for cooling the gas engine turbine or one or more components of the gas engine turbine. Such implementation ensures that a minimal oil pressure increase additional oil flow can be diverted to apply cooling, such that oil flow waste and excessive oil pump usage is minimized.

One aspect of the system of the present disclosure is that the electrical power is generated internal to the engine and there is no engine gearbox or mechanical drive train. The generator of the present disclosure is used as a motor to start the engine from an external power supply or battery on the ground, meaning electrical power cables may not need to be routed to the engine core.

Another aspect of the system of the present disclosure is that a dedicated electrical winding in the embedded generator provides independent power to the oil and fuel pump motors. This may avoid needing multiple generators to provide electrical power. The system of the present disclosure is configured to control additional cooling oil for the engine or components based on sensed or predicted engine or component temperatures and/or controlling oil pump output pressure to solve a cold oil problem.

One embodiment of an oil pumping system of the present disclosure may include a closed loop on sensed component temperature or modelled component temperature or open loop scheduling of cooling oil. In traditional systems, cooling oil flow is made available with excess oil pump capacity and then controlled based on control valve requiring additional complexity. A constant oil cooling flow may increase is a risk of over-cooling and of using excess power to pump the cooling oil when not required.

Without a regulating valve, oil flow can be directly controlled for the engine based on sensed or modelled engine temperatures. Electric starter generators may overheat during an engine start and/or repeated engine starts due to the high currents required to start the engine. On the other hand, at starting speeds, the speed and hence oil flow of a traditional mechanically driven oil pumps is low. The current supplied to the electric starter generator may be higher than necessary (i.e., over-boosted) during start causing the starter generator to get hot causing electric starter generator power and duty cycle to be limited.

The system of the present disclosure is such that the engine identifies condition using temperature sensing or based on starting cycle. Variable drive increases speed of oil pump motor to increase oil pump speed, thereby, increasing oil pump flow to provide additional oil cooling as needed. This allows for a smaller electric starter generator or longer electric starter generator duty cycle. Longer duty cycle minimizes time between start attempts.

The oil pumping system of the present disclosure is such that an oil pump motor variable drive controlling oil pump speed and hence oil flow rate with positive displacement pump. The oil pump motor variable drive with torque limit to act as oil pressure limit and avoid oil pump bypass or oil pressure regulator to minimize oil pump power consumption and/or to avoid filter bypass with cold oil due to high oil pressure. Pump power corresponds to a product of a volume flow and a delta pressure corresponds to a product between torque and angular velocity, and corresponds to a product of torque and a ratio of a volume flow and displacement of the pump. A pump delta pressure corresponds to a ratio between a pump torque and pump displacement.

The system of the present disclosure is such that a torque limit is used in combination with speed limit to ensure a lowest wins gate to select the minimum power for torque limit or speed control. Oil pump variable drive torque versus speed is proportional to pump pressure versus flow. Variable drive controller computes torque based on motor current and also speed based on voltage frequency or resolver. Accordingly, the variable driver controller can compute torque versus speed curve which is equivalent to delta pressure versus flow rate.

The system of the present disclosure is configured to control oil flow using oil pump speed to provide closed loop temperature control of the engine oil or engine or oil cooled engine component, for example, an oil cooled electric machine. Such that when oil or engine sump or oil cooled components are too hot the oil flow is increased to increase the cooling oil flow. Oil pump speed may control cooling flow to a dedicated oil cooling circuit using pressure regulated valve per the diagram in FIG. 2. Increasing pump speed increases pump flow and hence pump outlet pressure which opens pressure controlled bypass valve. Using this method higher pump speeds may control the oil flow for heat exchanger or oil cooling loop. Variable drive controller controls fuel pump speed to set engine oil flow and monitors variable drive motor torque to determine pump pressure.

Another embodiment of this concept is to use a variable speed controller to control fuel pump speed and hence fuel flow and determine the fuel flow verses fuel pressure characteristics. This characteristic may be compared to the predicted fuel system flow verses pressure curves, derived from engine combustor pressure and the fuel system flow restriction, to monitor fuel nozzle health or fuel filter blockage. This technique may also be used to identify major fuel leaks or open fuel bypass valves in the fuel system.

The present disclosure may allow for higher engine DC bus voltages at high engine speeds to reduce generator and DC bus current and minimize pump motor amperage heat losses and improve efficiency at maximum speed conditions with highest electrical loads. For permanent magnet (PM) motors voltage is proportional to speed so at higher speeds more voltage and power is available. If variable DC bus voltage used then a passive rectifier can be used. Higher DC bus voltage may result in lower variable drive current and to minimize heat losses.

One embodiment of a gas turbine engine oil pumping system includes a gas turbine engine that includes a compressor, combustor, and a turbine. The compressor and the turbine are configured to rotate about an axis at an engine speed. The gas turbine engine oil pumping system includes an electric machine and a rectifier connected to the electric machine. The gas turbine engine oil pumping system includes an oil pump assembly configured to provide a flow of oil to the gas turbine engine. The oil pump assembly includes an oil pump and a pump motor mechanically coupled to the oil pump and configured to drive the oil pump. The oil pump assembly includes a variable frequency drive controller electrically connected between the rectifier and the pump motor. The variable drive controller is configured to control a torque and speed of the pump motor independent of the engine speed so that the flow of the oil moved by the oil pump is controlled to cool or lubricate components of the gas turbine engine independent of the engine speed.

One other embodiment of the gas turbine engine oil pumping system of the present disclosure includes the pump motor and variable frequency drive powered from a dedicated independent generator winding from one of a plurality of generator windings on the same rotor. Another embodiment of the gas turbine engine oil pumping system of the present disclosure includes the electric machine having the plurality of generator windings.

Another embodiment of the gas turbine engine oil pumping system of the present disclosure includes the electric machine providing electrical power being embedded inside the gas turbine engine and being driven by an engine shaft with one or more independent electrical windings. Still another embodiment of the gas turbine engine oil pumping system of the present disclosure includes the electric machine being an electric starter generator configured for use in a motor mode to supply electrical energy to the gas turbine engine to start the gas turbine engine and in a generate mode in which the electric machine is configured to generate electrical power in response to being driven by the gas turbine.

Yet another embodiment of the gas turbine engine oil pumping system of the present disclosure includes the controller is programmed to, during a start-up phase of the gas turbine engine, limit the torque of the pump motor to a first predetermine torque and to limit the speed of the pump motor to a first predetermined speed to minimize electric current and power of the pump motor and avoid over-pressure of the oil during the start-up phase.

Another embodiment of the gas turbine engine oil pumping system of the present disclosure includes one or more scavenge or return oil pump elements also driven by the oil pump motor that remove oil from the engine sumps and return the oil to the oil tank where the oil can be recirculated back into the engine. Still another embodiment of the gas turbine engine oil pumping system of the present disclosure includes the controller programmed to determine, during use of the pump motor, an active torque versus speed curve of the oil pump motor, compare the active torque versus speed curve to a predetermined baseline torque versus speed curve, and generate a signal in response to a difference between the active torque versus speed curve and the baseline torque versus speed curve being greater than a preset value.

Yet another embodiment of the gas turbine engine oil pumping system of the present disclosure includes the controller that determines a temperature of a component of the gas turbine engine and increases the flow of oil by increasing the oil pump speed in response to the temperature of the component being greater than a predetermined value.

Another embodiment of the gas turbine engine oil pumping system of the present disclosure includes the controller programmed to vary the oil pump speed to control, via a closed loop, one of an engine oil temperature and an oil cooled engine component temperature. Still another embodiment of the gas turbine engine oil pumping system of the present disclosure includes the controller programmed to determine a temperature of the one of the oil cooled engine component and the engine oil temperature based on an operational condition of the gas turbine engine and engine temperature sensors included in the gas turbine engine.

Another embodiment of the gas turbine engine oil pumping system of the present disclosure includes the controller programmed to increase the flow of oil to open a pressure activated oil valve to provide additional cooling flow to a component of the gas turbine engine at a higher oil pressure such that further increases in a speed of the oil pump results in more flow through the pressure activated oil valve to cool the component. Still another embodiment of the gas turbine engine oil pumping system of the present disclosure includes the controller programmed, using closed loop control, to control the flow of oil to the component by using the oil pump speed to control the flow of oil using the pressure activated oil valve.

Yet another embodiment of the gas turbine engine oil pumping system of the present disclosure includes the oil pump assembly includes a heat exchanger and the flow of oil is configured to pass through the heat exchanger to cool the flow of oil. Another embodiment of the gas turbine engine oil pumping system of the present disclosure includes the controller programmed to increase the flow of oil to increases an oil pressure of the flow of oil to open a pressure activated oil valve to provide additional oil flow to the heat exchanger with the increased oil pressure. Still another embodiment of the gas turbine engine oil pumping system of the present disclosure includes the controller programmed with closed loop to control the flow of oil to the component by varying a speed of the oil pump.

One example implementation of a method of the present disclosure for use with a gas turbine engine includes rotating a compressor and a turbine of the gas turbine engine about an axis at an engine speed, generating electric power using an electric machine, supplying electric power to a pump motor connected to an oil pump, pumping oil from the oil pump to the gas turbine engine, and varying the electric power supplied to the pump motor to control a torque and speed of the pump motor independent of the engine speed.

Another embodiment of the method of the present disclosure is such that, during a start-up phase of the gas turbine engine, limiting the torque of the pump motor to a first predetermine torque and limiting the speed of the pump motor to a first predetermined speed to minimize electric power and current of the pump motor and control the maximum pressure of the oil during the start-up phase.

Another embodiment of the method of the present disclosure includes determining an active torque versus speed curve of the pump motor during use of the pump motor, comparing the active torque versus speed curve to a predetermined baseline torque versus speed curve, and generating a signal in response to a difference between the active torque versus speed curve and the baseline torque versus speed curve being greater than a preset value.

Still another embodiment of the method of the present disclosure includes determining a temperature of a flow of the oil and increasing a speed of the pump motor in response to the temperature of the flow of the oil being greater than a predetermined temperature value. Yet another embodiment of the method of the present disclosure includes determining a temperature of a component included in the gas turbine engine and increasing a speed of the pump motor in response to the temperature of the component being greater than a predetermined temperature value.

One embodiment of a gas turbine engine oil pumping system of the present disclosure a gas turbine engine that includes a compressor, combustor, and a turbine. The compressor and the turbine configured to rotate about an axis at an engine speed. The gas turbine engine oil pumping system includes motor generator having a plurality of windings. The gas turbine engine oil pumping system includes an oil pump assembly configured to provide a flow of oil to the gas turbine engine. The oil pump assembly includes an oil pump and a pump motor mechanically coupled to the oil pump and configured to drive the oil pump. The gas turbine engine oil pumping system includes a controller electrically connected between the motor generator and the pump motor. The controller is configured to control a torque and speed of the pump motor independent of the engine speed so that the flow of the oil moved by the oil pump is independent of the engine speed.

Another embodiment of the gas turbine engine oil pumping system is such that, during a start-up phase of the gas turbine engine, the controller is programmed to limit the torque of the pump motor to a first predetermine torque and to limit the speed of the pump motor to a first predetermined speed to minimize an electric current of the pump motor and maximize an allowable pressure of the oil during the start-up phase. Still another embodiment of the gas turbine engine oil pumping system is such that the controller is programmed to detect a cold start-up phase of the gas turbine engine based on a temperature of the oil being less than a predetermined temperature.

Yet another embodiment of the gas turbine engine oil pumping system is such that the oil pump assembly does not include a bypass valve or pressure regulator valve. Still another embodiment of the gas turbine engine oil pumping system is such that the controller is programmed to determine an active torque versus speed curve of the pump motor during use of the pump motor, compare the active torque versus speed curve to a predetermined baseline torque versus speed curve, and generate a signal in response to a difference between the active torque versus speed curve and the baseline torque versus speed curve being greater than a preset value.

Another embodiment of the gas turbine engine oil pumping system is such that the controller is programmed to determine a temperature of the flow of oil and increase a speed of the pump motor in response to the temperature of the flow of oil being greater than a predetermined temperature value. Yet another embodiment of the gas turbine engine oil pumping system is such that the controller is programmed to determine the temperature of the flow of oil by measuring a temperature of the flow of oil directly or a temperature of an oil sump included in the gas turbine engine.

Another embodiment of the gas turbine engine oil pumping system is such that the controller is programmed to determine the temperature of the flow of oil by calculating a temperature of the flow of oil based on an operational condition of the gas turbine engine or ambient temperature of air surrounding the gas turbine engine. Still another embodiment of the gas turbine engine oil pumping system is such that the controller is programmed to determine a temperature of a component included in the gas turbine engine and increase a speed of the pump motor in response to the temperature of the component being greater than a predetermined temperature value.

Yet another embodiment of the gas turbine engine oil pumping system is such that the controller is programmed to determine the temperature of the component by measuring a temperature of the flow of oil or the component directly. Another embodiment of the gas turbine engine oil pumping system is such that the controller is programmed to determine the temperature of the component by calculating a temperature of the component based on an operational condition of the gas turbine engine or ambient temperature of air surrounding the gas turbine engine. Still another embodiment of the gas turbine engine oil pumping system is such that the plurality of windings included in the motor generator includes windings configured to generate power only for use with the pump motor.

One embodiment of a method for use with a gas turbine engine of the present disclosure includes rotating a compressor and a turbine of the gas turbine engine about an axis at an engine speed. The method for use with a gas turbine engine of the present disclosure includes supplying electric power to a pump motor connected to an oil pump. The method for use with a gas turbine engine of the present disclosure includes conducting oil from the oil pump to the gas turbine engine. The method for use with a gas turbine engine of the present disclosure includes varying the electric power supplied to the pump motor to control a torque and speed of the pump motor independent of the engine speed.

Another embodiment of the method for use with a gas turbine engine of the present disclosure includes, during a start-up phase of the gas turbine engine, limiting the torque of the pump motor to a first predetermine torque and limiting the speed of the pump motor to a first predetermined speed to minimize an electric current of the pump motor and maximize the allowable pressure of the oil during the start-up phase.

Yet another embodiment of the method for use with a gas turbine engine of the present disclosure includes determining an active torque versus speed curve of the pump motor during use of the pump motor, comparing the active torque versus speed curve to a predetermined baseline torque versus speed curve, and generating a signal in response to a difference between the active torque versus speed curve and the baseline torque versus speed curve being greater than a preset value.

Another embodiment of the method for use with a gas turbine engine of the present disclosure includes determining a temperature of the flow of oil and increasing a speed of the pump motor in response to the temperature of the flow of oil being greater than a predetermined temperature value. Still another embodiment of the method for use with a gas turbine engine of the present disclosure includes determining a temperature of a component included in the gas turbine engine and increasing a speed of the pump motor in response to the temperature of the component being greater than a predetermined temperature value.

While the disclosure has been illustrated and described in detail in the foregoing drawings and description, the same is to be considered as exemplary and not restrictive in character, it being understood that only illustrative embodiments thereof have been shown and described and that all changes and modifications that come within the spirit of the disclosure are desired to be protected.

What is claimed is:

1. A gas turbine engine oil pumping system comprising:
   a gas turbine engine that includes a compressor, combustor, and a turbine, the compressor and the turbine configured to rotate about an axis at an engine speed;
   an electric machine;
   a rectifier connected to the electric machine;
   an oil pump assembly configured to provide a flow of oil to the gas turbine engine, the oil pump assembly including an oil pump and a pump motor mechanically coupled to the oil pump and configured to drive the oil pump; and
   a variable frequency drive controller electrically connected between the rectifier and the pump motor, the variable frequency drive controller programmed to control a torque and speed of the pump motor independent of the engine speed so that the flow of the oil moved by the oil pump is controlled to cool or lubricate components of the gas turbine engine independent of the engine speed,
   wherein the pump motor and variable frequency drive controller are powered from a dedicated independent generator winding from one of a plurality of generator windings on the same rotor, wherein the plurality of generator windings are included in the electric machine.

2. The gas turbine engine oil pumping system of claim 1, wherein the electric machine providing electrical power is embedded inside the gas turbine engine and driven by an engine shaft with one or more independent electrical windings of the plurality of generator windings.

3. The gas turbine engine oil pumping system of claim 1, wherein the electric machine is an electric starter generator configured for use in a motor mode to supply electrical energy to the gas turbine engine to start the gas turbine engine and in a generate mode in which the electric machine is configured to generate electrical power in response to being driven by the gas turbine engine.

4. The gas turbine engine oil pumping system of claim 1, wherein during a start-up phase of the gas turbine engine, the variable frequency drive controller is programmed to limit the torque of the pump motor to a first predetermine torque and to limit the speed of the pump motor to a first predetermined speed to minimize electric current and power of the pump motor and avoid over-pressure of the oil during the start-up phase.

5. The gas turbine engine oil pumping system of claim 1, wherein during system testing or the start-up phase of the gas turbine engine the variable frequency drive controller is programmed to evaluate the oil pump torque vs. speed curve and hence pressure vs. flow curve relative to the predicted pressure vs flow curve for the measured oil temperature state to determine the health of the oil system.

6. The gas turbine engine oil pumping system of claim 1, wherein the variable frequency drive controller determines a temperature of a component of the gas turbine engine and increases the flow of oil by increasing the oil pump speed in response to the temperature of the component being greater than a predetermined value.

7. The gas turbine engine oil pumping system of claim 6, wherein the oil pump assembly includes a heat exchanger and the flow of oil is configured to pass through the heat exchanger to cool the flow of oil.

8. The gas turbine engine oil pumping system of claim 7, wherein the variable frequency drive controller is programmed to increase the flow of oil to increases an oil pressure of the flow of oil to open a pressure activated oil valve to provide additional oil flow to the heat exchanger with the increased oil pressure.

9. The gas turbine engine oil pumping system of claim 8, wherein the variable frequency drive controller is programmed to provide closed loop temperature control by varying a speed of the oil pump.

10. The gas turbine engine oil pumping system of claim 1, wherein one of an oil cooled engine component temperature and an engine oil temperature is controlled via closed loop by varying the oil pump speed.

11. The gas turbine engine oil pumping system of claim 1, wherein the variable frequency drive controller is programmed to increase the flow of oil to open a pressure activated oil valve to provide additional cooling flow to a component of the gas turbine engine at a higher oil pressure such that further increases in a speed of the oil pump results in more flow through the pressure activated oil valve to cool the component.

12. The gas turbine engine oil pumping system of claim 11, wherein the variable frequency drive controller is programmed to provide closed loop temperature control by using the oil pump speed to control the flow of oil using the pressure activated oil valve.

13. A gas turbine engine oil pumping system comprising:
a gas turbine engine that includes a compressor, combustor, and a turbine, the compressor and the turbine configured to rotate about an axis at an engine speed;
an electric machine;
a rectifier connected to the electric machine;
an oil pump assembly configured to provide a flow of oil to the gas turbine engine, the oil pump assembly including an oil pump and a pump motor mechanically coupled to the oil pump and configured to drive the oil pump; and
a variable frequency drive controller electrically connected between the rectifier and the pump motor, the variable frequency drive controller programmed to control a torque and speed of the pump motor independent of the engine speed so that the flow of the oil moved by the oil pump is controlled to cool or lubricate components of the gas turbine engine independent of the engine speed,
wherein the variable frequency drive controller is programmed to determine an active torque versus speed curve of the pump motor during use of the pump motor, compare the active torque versus speed curve to a predetermined baseline torque versus speed curve, and generate a signal in response to a difference between the active torque versus speed curve and the baseline torque versus speed curve being greater than a preset value.

14. A method for use with a gas turbine engine, the method comprising:
rotating a compressor and a turbine of the gas turbine engine about an axis at an engine speed;
generating electric power using an electric machine;
supplying electric power to a pump motor connected to an oil pump;
pumping oil from the oil pump to the gas turbine engine; and
varying the electric power supplied to the pump motor to control a torque and speed of the pump motor independent of the engine speed,
further comprising determining a temperature of a flow of the oil and increasing a speed of the pump motor in response to the temperature of the oil being greater than a predetermined temperature value.

15. The method of claim 14, further comprising, during a start-up phase of the gas turbine engine, limiting the torque of the pump motor to a first predetermine torque and limiting the speed of the pump motor to a first predetermined speed to minimize electric power and current of the pump motor and control the maximum pressure of the oil during the start-up phase.

16. The method of claim 14, further comprising determining an active torque versus speed curve of the pump motor during use of the pump motor, comparing the active torque versus speed curve to a predetermined baseline torque versus speed curve, and generating a signal in response to a difference between the active torque versus speed curve and the baseline torque versus speed curve being greater than a preset value.

17. The method of claim 14, further comprising determining a temperature of a component included in the gas turbine engine and increasing a speed of the pump motor in response to the temperature of the component being greater than a predetermined temperature value.

* * * * *